US006490834B1

(12) United States Patent
Dagher (10) Patent No.: US 6,490,834 B1
(45) Date of Patent: Dec. 10, 2002

(54) BUILDING CONSTRUCTION CONFIGURATION AND METHOD

(75) Inventor: Habib J. Dagher, Veazie, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 09/493,555

(22) Filed: Jan. 28, 2000

(51) Int. Cl.7 ................................................ E04B 1/14
(52) U.S. Cl. .................. 52/506.01; 52/309.1; 52/309.3; 52/746.1; 52/DIG. 7
(58) Field of Search ..................... 52/506.01, 309.1, 52/309.3, 309.13, 309.14, 630, 747.1, 746.11, 746.1, DIG. 7, 416, 417; 156/71, 304.1

(56) References Cited

U.S. PATENT DOCUMENTS

| | | | |
|---|---|---|---|
| 2,641,029 A | | 6/1953 | Trimmer |
| 3,754,977 A | | 8/1973 | Lankheet |
| 3,788,682 A | | 1/1974 | Ehrlich |
| 4,091,153 A | | 5/1978 | Holman |
| 4,158,078 A | | 6/1979 | Egger et al. |
| 4,297,817 A | | 11/1981 | Bullock et al. |
| 4,320,160 A | | 3/1982 | Nishimura et al. |
| 4,346,541 A | | 8/1982 | Schmitt |
| 4,397,705 A | * | 8/1983 | Eckert .......................... 156/242 |
| 4,984,947 A | | 1/1991 | Flauraud |
| 5,018,324 A | | 5/1991 | Lankheet |
| 5,106,666 A | | 4/1992 | Fitzgerald et al. |
| 5,153,058 A | | 10/1992 | Hall et al. |
| 5,565,257 A | * | 10/1996 | Tingley ........................ 428/114 |
| 5,721,036 A | | 2/1998 | Tingley |
| 5,733,824 A | * | 3/1998 | Brunka et al. ................ 442/153 |
| 5,830,308 A | * | 11/1998 | Reichard ....................... 156/291 |
| 5,839,250 A | * | 11/1998 | Hibler .......................... 52/746.1 |
| 5,881,521 A | | 3/1999 | Porter et al. |
| 5,910,352 A | * | 6/1999 | Tingley ........................ 428/114 |
| 5,925,579 A | | 7/1999 | Neuner et al. |
| 5,972,141 A | | 10/1999 | Ellyin |
| 6,050,047 A | * | 4/2000 | Covelli et al. ............... 52/730.7 |
| 6,051,301 A | * | 4/2000 | Tingley ........................ 428/106 |
| 6,145,260 A | * | 11/2000 | Morton ........................ 52/293.2 |
| 6,217,976 B1 | | 4/2001 | Macpherson et al. |
| 6,226,957 B1 | * | 5/2001 | Stough ......................... 52/745.2 |

OTHER PUBLICATIONS

Samuel Devlin, "Devlin's Boatbuilding" How To Build Any Boat The Stitch–And–Glue Way ©1996.

* cited by examiner

Primary Examiner—Carl D. Friedman
Assistant Examiner—Jennifer I. Thissell
(74) Attorney, Agent, or Firm—MacMillan, Sobanski & Todd, LLC (57) ABSTRACT

A building construction configuration comprising an assemblage of wood sheathing panels positioned adjacent one another to form a panel assembly having elongated joints between adjacent panels, and reinforcement strips of fiber reinforced polymer material bonded to the panels. The reinforcement strips cover an area that is within the range of from about 5 to about 50 percent of the surface area of the panels. In another embodiment of the invention, there is provided a method of constructing a building comprising applying wood sheathing panels to a framework to form a building shell, bonding reinforcement strips of fiber reinforced polymer material to the wood sheathing panels to bond at least some of the wood sheathing panels to each other, and covering the building shell with a finished exterior.

28 Claims, 5 Drawing Sheets

BUILDING CONSTRUCTION CONFIGURATION AND METHOD

BACKGROUND OF THE INVENTION

This invention relates in general to strengthening wood-frame construction, and in particular, to a method of strengthening wood-frame construction and increase its resistance to high wind, earthquake or blast loadings by applying strips of fiber reinforced polymers to the panels. A very common wood frame construction method uses wood or steel studs or wood or steel framing with plywood or Oriented Strand Board (OSB) sheathing panels or stucco sheathing. The framing/sheathing combination forms shear walls and horizontal diaphragms which resist horizontal and vertical loads applied to the structure. This form of construction is used in the majority of single family homes in the United States, as well as a significant portion of multi-family, commercial and industrial facilities.

While the system has generally performed well, the economic losses in the United States due to natural disasters, such as hurricanes, earthquakes and tornadoes, have been mounting. The economic losses caused by these natural disasters in the United States has averaged about $1 billion/week in recent years. Most of these losses are due to hurricanes (80%) and earthquakes (10%). For example, loss of roof sheathing under hurricane winds has often been attributed to improper fastening of the sheathing to the framing, such as by the use of larger nail spacing than allowed by code, nails missing the support framing members, or over-driven nails. Loss of sheathing in hurricanes weakens the roof structure and can lead to roof failures. The water damage resulting from a loss of roof sheathing or roof failures has been a major contributor to economic losses in hurricanes. Surveys also show that a significant portion of the damage resulting from hurricanes or earthquakes occurs in nonstructural parts of the home due to excessive deformation or movements of the structure. The cost to repair nonstructural damage often makes it necessary to rebuild the structure rather than to repair it.

While the knowledge to mitigate hurricane and earthquake damage exists today, building code provisions are often misunderstood by builders, and compliance with regulations is difficult to enforce because of the difficulty of inspecting in the field. As a result, surveys show that a significant portion of the damage to homes and property caused by natural disasters is due to lack of conformance to codes. Improper connections between walls at building corners, such as non-overlapping top plates or improper or missing hold-downs to tie the shear walls to the foundations, are further examples of poor construction practices that are difficult to inspect.

Therefore, there is a need for a simple, easy-to-inspect, inexpensive construction method to strengthen and stiffen conventional construction for improved performance against hurricane and earthquake damage. The construction method should increase the strength and ductility of wood buildings and reduce the deformation of the buildings to limit damage to non-structural members.

SUMMARY OF THE INVENTION

The above objects as well as other objects not specifically enumerated are achieved by a building construction configuration comprising an assemblage of wood sheathing panels positioned adjacent one another to form a panel assembly having elongated joints between adjacent panels, and reinforcement strips of fiber reinforced polymer material bonded to the panels. The reinforcement strips cover an area that is within the range of from about 5 to about 50 percent of the surface area of the panels.

In another embodiment of the invention, there is provided a building construction configuration comprising an assemblage of wood sheathing roof panels positioned adjacent one another to form a building roof having elongated joints between adjacent panels, and reinforcement strips of fiber reinforced polymer material bonded to the panels. The reinforcement strips cover at least 20 percent of the joints, thereby bonding together substantially all of the panels in the building roof.

In another embodiment of the invention, there is provided a building construction configuration comprising an assemblage of wood sheathing roof panels positioned adjacent one another to form a building roof having elongated joints between adjacent panels, and reinforcement strips of fiber reinforced polymer material bonded to the panels. The reinforcement strips are concentrated at the ridge, eave and edge areas of the roof.

In another embodiment of the invention, there is provided a building construction configuration comprising an assemblage of wood sheathing roof panels positioned adjacent one another to form a building roof, and an assemblage of wood sheathing shear wall panels positioned adjacent one another to form a building wall. A joint is formed between the roof panels and the shear wall panels, and reinforcement strips of fiber reinforced polymer material are bonded to at least some of the roof panels and at least some of the shear wall panels.

In another embodiment of the invention, there is provided a building construction configuration comprising an assemblage of shear wood sheathing wall panels positioned adjacent one another to form a first building wall, and an assemblage of shear wood sheathing wall panels positioned adjacent one another to form a second building wall, where a joint is formed between the first building wall and the second building wall. Reinforcement strips of fiber reinforced polymer material bonded to at least some of the shear wall panels in the first building wall and at least some of the shear wall panels in the second building wall.

In another embodiment of the invention, there is provided a method of constructing a building comprising applying wood sheathing panels to a framework to form a building shell, bonding reinforcement strips of fiber reinforced polymer material to the wood sheathing panels to bond at least some of the wood sheathing panels to each other, and covering the building shell with a finished exterior.

Various objects and advantages of this invention will become apparent to those skilled in the art from the following detailed description of the preferred embodiment, when read in light of the accompanying drawings.

DETAILED DESCRIPTION OF THE INVENTION

In general, this invention consists of a simple and effective method to strengthen conventional wood construction and increase its resistance to loading from blasts of various types, earthquakes, and high winds such as generated by tornadoes or hurricanes. The method may be either used for new construction prior to the application of the siding, or used to retrofit existing buildings. It may be used with either wood, wood composite or steel framing, and wood sheathing. In general, an application of the method of the invention in constructing a building involves applying or adding wood sheathing panels to a framework to form a building shell, bonding reinforcement strips of fiber reinforced polymer material to the wood sheathing panels to bond at least some of the wood sheathing panels to each other, and covering the building shell with a finished exterior, such as a roof covering and siding.

The invention includes applying fiber reinforced polymer (also known as fiber reinforced plastic, and hereinafter referred to as "FRP") strips to the wood sheathing of a structure to enhance the resistance of the structure to earthquakes and high winds from hurricanes and tornadoes. These strips are applied to the surface of the wood sheathing. For purposes of this invention, wood sheathing includes plywood, oriented strand board (hereinafter "OSB"), and other wood based composite panels. The reinforcement strips are typically but not necessarily positioned between the wall sheathing and the siding, between the floor sheathing and the flooring, and between the roof sheathing and the roofing material.

Figure 1:
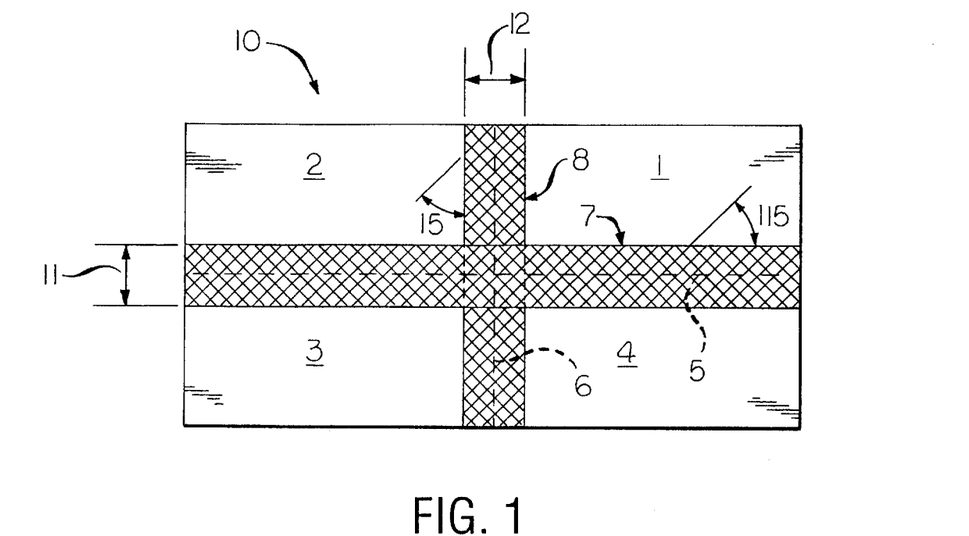
FIG. 1 is a schematic plan view of a building panel assembly constructed from four panels according to the construction method of the invention.

The field reinforcement of joints between sheathing panels according to the construction method of the invention is shown generally in FIG. 1. FIG. 1 illustrates FRP field reinforcement strips 7 and 8, respectively, applied to joints 5 and 6 between sheathing panels 1, 2, 3 and 4, thereby bonding the individual sheathing panels into a panel assembly 10. The sheathing panels are of the type used for shear walls (vertical load bearing walls), horizontal diaphragms or roof diaphragms. Field reinforcement is defined as FRP reinforcing strips that span the joints between adjacent or abutting individual sheathing panels. The reinforcement strips 7 and 8 have strip widths of 11 and 12, respectively.

Therefore, it can be seen that where the panels are assembled into a panel assembly that is used on a roof, the reinforcement strips cover only a portion of the joints, preferably at least 20 percent of the joints, thereby bonding together substantially all of the panels in the building roof.

The composition of the FRP resinous material, and the fiber orientation, type, spacing, density, diameter, strength, coatings and sizing material, as well as other characteristics fiber/laminate architecture will vary depending on the intended application and the availability and cost of the FRP materials. A more detailed description of the FRP materials and design is given below.

Figure 2:
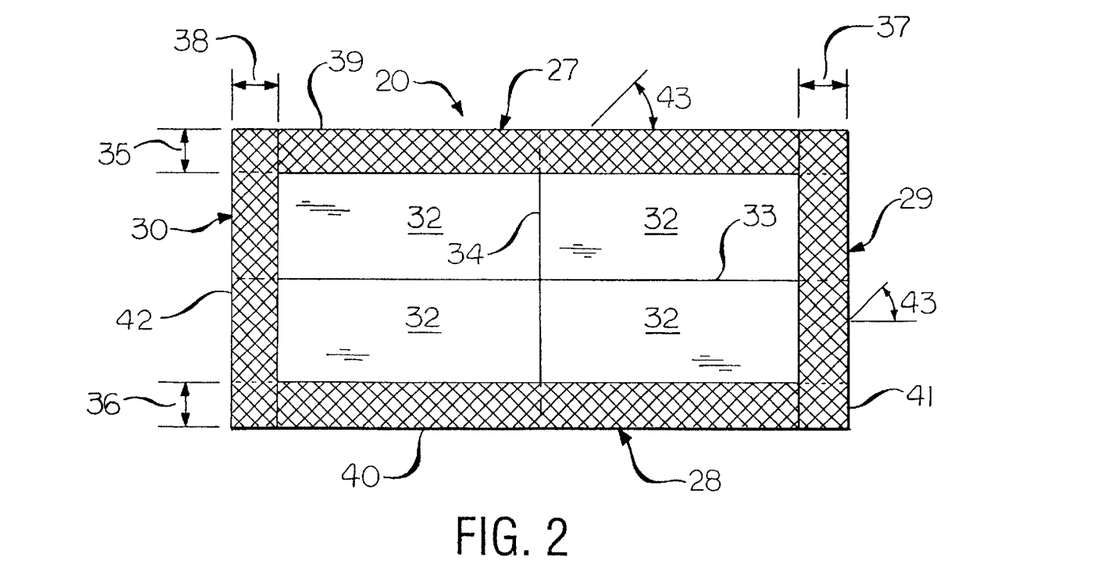
FIG. 2 is a schematic plan view of another panel assembly constructed according to another embodiment of the construction method of the invention.

As shown in FIG. 2, another embodiment of the invention comprises a panel assembly 20 that includes perimeter reinforcement around diaphragms or sub-diaphragms for use in roofs or walls. FRP perimeter reinforcement strips 27, 28, 29, and 30 are applied to the perimeter areas of an assemblage of sheathing panels 32 that are joined together at joints 33 and 34. The panel assembly 20 can be used as a shear wall section, horizontal diaphragm section or roof diaphragm section. The reinforcing strips can have widths 35, 36, 37 and 38, respectively, and can be of any suitable construction, similar to the construction of strips 7 and 8, described above with respect to FIG. 1. For additional overall strength of the building under construction, the perimeter reinforcement strips 27–30 can be extended beyond the edges 39, 40, 41 and 42, respectively of the panel assembly 20 and anchored to the rest of the structure.

Figure 3:
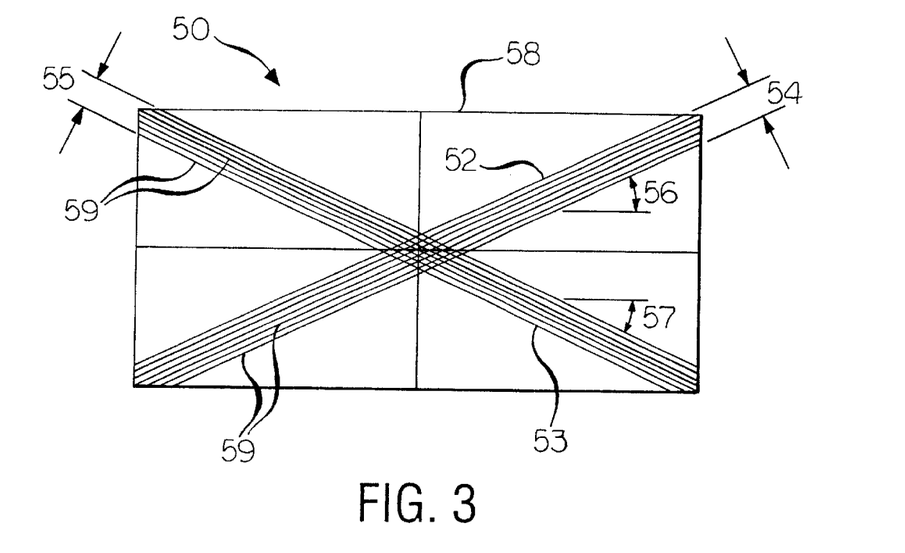
FIG. 3 is a schematic plan view of yet another panel assembly constructed according to yet another embodiment of the construction method of the invention.

As shown in FIG. 3, another embodiment of the invention comprises a panel assembly 50 that includes truss reinforcement of all or portions of the panels. The panel assembly 50 can be used in shear walls, horizontal diaphragms or roof diaphragms. The panel assembly 50 shown includes four sheathing panels 51 assembled together. FRP truss reinforcement strips 52 and 53 are applied diagonally to the panel assembly 50. The reinforcing strips can have widths 54 and 55, respectively, and can be of any suitable construction, similar to the construction of strips 7 and 8, described above with respect to FIG. 1. For additional overall strength of the building under construction, the truss reinforcement strips 52 and 53 can be extended beyond the edges of the panel assembly 20 and anchored to the rest of the structure. The truss reinforcement strips 52 and 53 are set at angles 56 and 57, respectively, to the longitudinal edge 58 of the panel assembly 50. The fibers 59 within the truss reinforcement strips 52 and 53 can be set to be parallel to the length of the truss reinforcement strips, or can be given any other suitable configuration.

Figure 4:
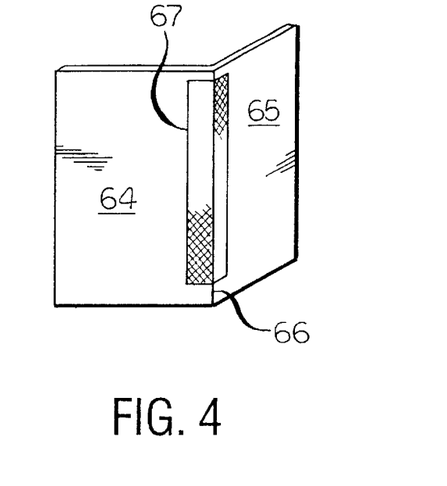
FIG. 4 is a partial schematic view in perspective of two walls of a building, illustrating vertical corner banding according to the invention.

As shown in FIG. 4, first and second building walls, 64 and 65 form a corner joint 66 where the walls meet. A strip of FRP reinforcement 67 overlaps the joint 66 and extends longitudinally along the joint. The FRP reinforcement 67 used in the vertical corner banding can be any suitable type of reinforcement, such as those described above.

Figure 5:
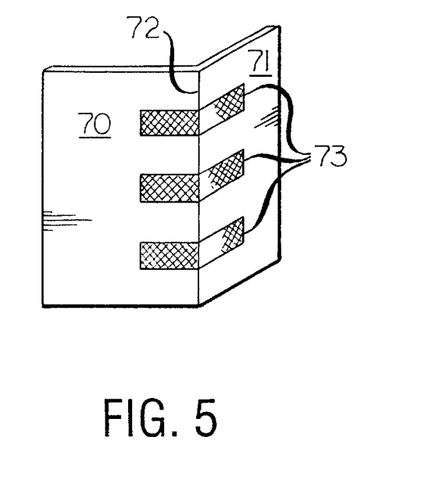
FIG. 5 is a partial schematic view in perspective of two walls of a building, illustrating horizontal intermittent corner banding according to the invention.

As shown in FIG. 5, two building walls, 70 and 71 form a corner joint 72 where the walls meet. A plurality of intermittent strips of FRP reinforcement 73 overlap the joint 72 and extends transverse to the joint. The FRP reinforcement 73 used in the horizontal intermittent corner banding can be any suitable type of reinforcement, such as those described above.

Figure 6:
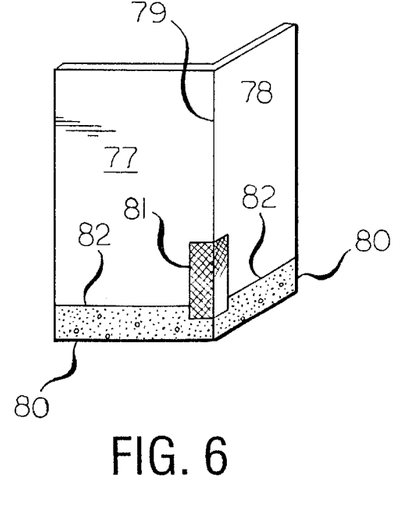
FIG. 6 is a partial schematic view in perspective of two walls of a building, illustrating sheathing-foundation banding according to the invention.

FIG. 6 illustrates that the two building walls 77 and 78 forming a corner joint 79 where the walls meet can be reinforced according to the invention in a manner that bonds the walls 77 and 78 to the foundation 80. A strip of FRP reinforcement 81 overlaps the corner joint 79 and extends longitudinally along the joint 79 to the extent that the FRP reinforcement covers a portion of the foundation 80. Also, it can be seen that the FRP reinforcement 81 overlaps the horizontal joint 82 between the shear walls 77 and 78, and the foundation 80. The connection between the external shear walls 77 and 78 and the foundation 80 at the corner joint 79 increases the resistance of the shear walls 77 and 78 to uplift and separation from the foundation.

Figure 7:
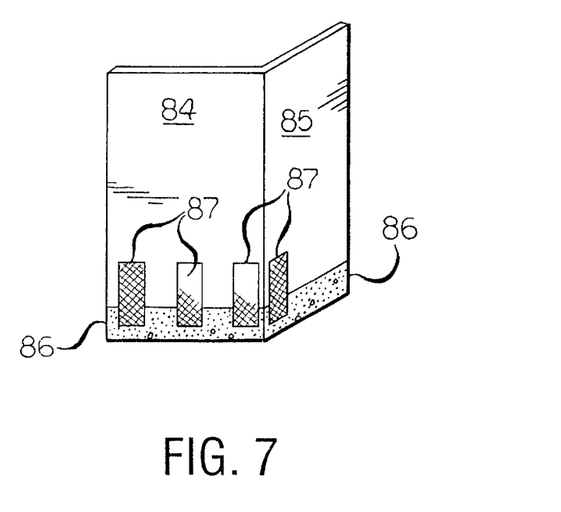
FIG. 7 is a partial schematic view in perspective of two walls of a building, illustrating sheathing-foundation intermittent banding according to the invention.

As shown in FIG. 7, the connection between the shear building walls 84 and 85, and the building foundation 86 can be made using intermittent vertical banding of vertical strips 87 of FRP reinforcement material. Also, it can be seen that the FRP reinforcement 87 overlaps the horizontal joint 88 between the shear walls 84 and 85, and the foundation 86. This reinforcement will increase the resistance of the shear walls 84, 85 to separation from the foundation 86 by both uplift and horizontal shear.

The FRP reinforcement strips 81 and 87 illustrated in FIGS. 6 and 7, respectively, can be any suitable reinforcement material capable of being applied to the building walls. Such materials can be similar to those described above with respect to FIGS. 1–5.

Figure 8:
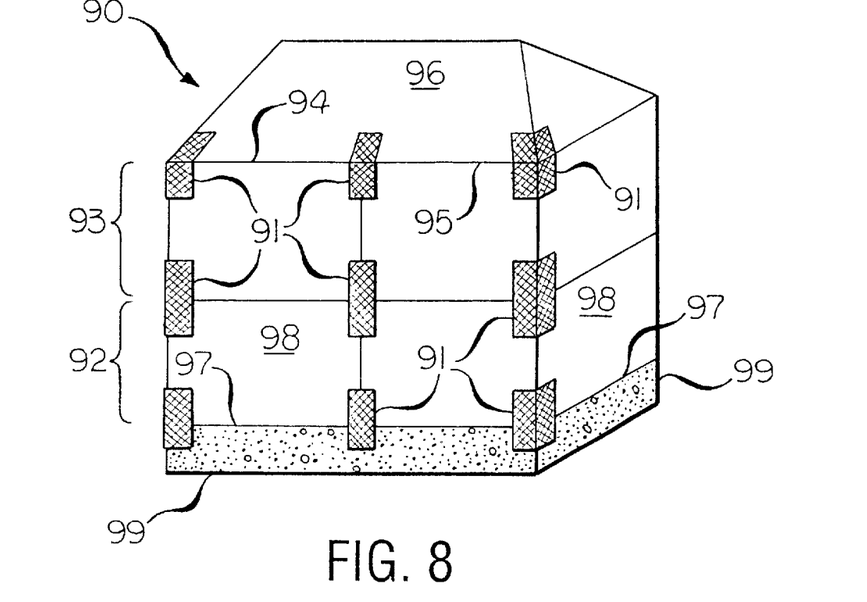
FIG. 8 is a schematic view in perspective of a building, illustrating the field strengthening method according to the invention, using intermittent vertical banding.

As shown in FIG. 8, a 2-story building 90 can be field strengthened using intermittent strips 91 of vertical FRP banding. Preferably, the strips 91 not only extend partially along the height of the first story 92 and the second story 93, but also overlap the horizontal joint 94 formed by the top of the shear wall 95 and the roof 96. Also, the strips 91 overlap the horizontal joint 97 formed by the shear walls 98 and the building foundation 99. The reinforcements strips 91 increase the connection strength between the foundation 99 and the shear wall 98 of the first story 92, between the shear wall 98 of the first story 92 and the shear wall 98 of the second story 93, and between the shear wall 98 of the second story 93 and the roof 96. Preferably, at least 20 percent of the length of the joint formed between the roof panels and the shear wall panels is reinforced.

Figure 9:
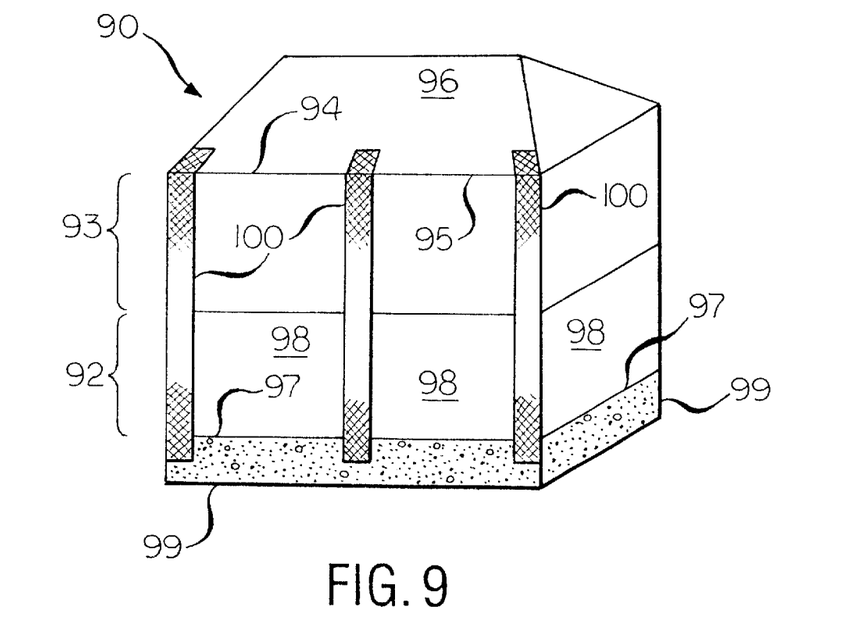
FIG. 9 is a schematic view in perspective of a building, illustrating the field strengthening method according to the invention, using continuous vertical banding.

FIG. 9 is similar to FIG. 8, except that the FRP reinforcement strips 100 are continuous vertical banding strips rather than intermittent vertical banding strips. The continuous banding using FRP reinforcements strops 100 provides an alternate continuous load path all the way to the foundation 99, and this configuration is superior in withstanding wind loads and earthquakes relative to the design illustrated in FIG. 8.

Figure 10:
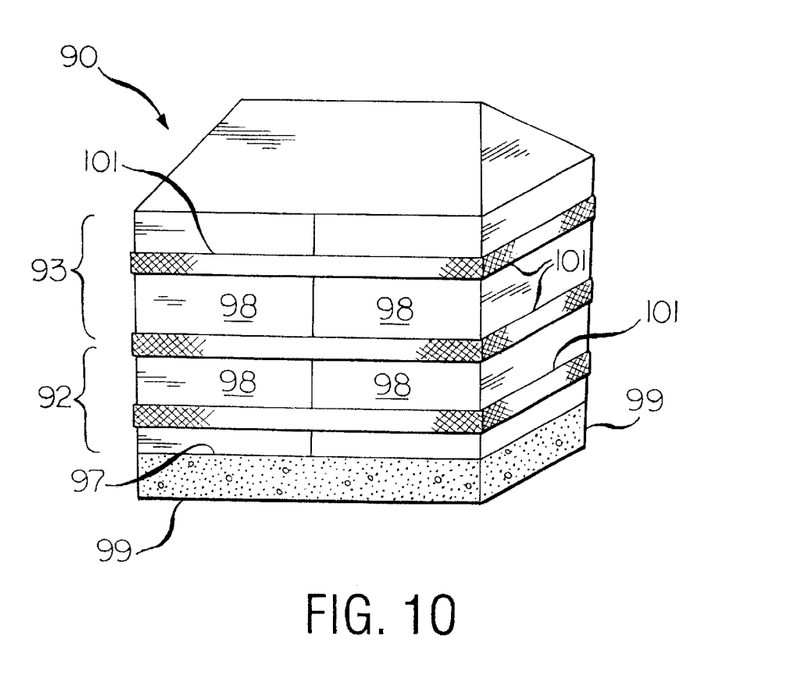
FIG. 10 is a schematic view in perspective of a building, illustrating the field strengthening method according to the invention, using continuous horizontal banding.

FIG. 10 is similar to FIG. 8, except that the FRP reinforcement strips 101 are continuous horizontal banding strips rather than the intermittent vertical banding strips shown in FIG. 8. If the intermittent horizontal strips 101 are placed at the joints between various sections of the building, then the connection between the various sections can be strengthened. For example, placing a horizontal FRP strip 101 along the joint 97 between the foundation 99 and the first story shear wall 98 not only increases the connection strength between adjacent horizontal panels 98, but also increases the connection strength between the foundation 99 and the first story shear walls 98. Similar strengthening of connections between the first and second stories, 92, 93, and between the second story 93 and the roof 96, can be made with the horizontal FRP strip 101. The continuous horizontal banding also reduces the likelihood of wall sheathing loss under hurricane winds.

Figure 11:
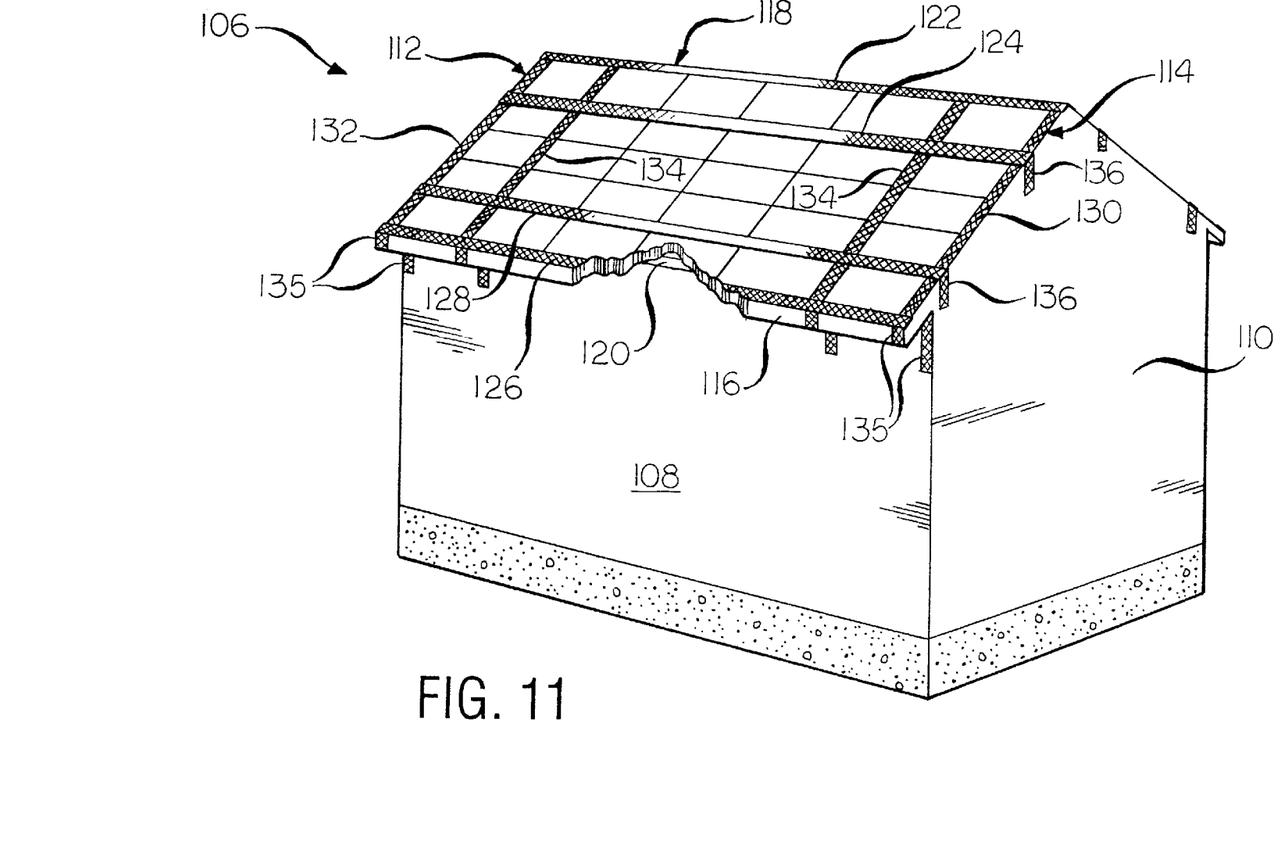
FIG. 11 is a schematic perspective view of a building and roof, illustrating the application of field and perimeter reinforcement at selected joints according to the invention.

FIG. 11 illustrates a preferred embodiment for application of field and perimeter strip reinforcement to reduce roof sheathing panel loss under hurricane winds. Roof sheathing panel loss under hurricane winds can result in significant water damage to a structure, the most costly cause of property loss in hurricanes. Preferably, FRP reinforcement strips are field applied to reinforce the roof perimeter and other roof areas of highest localized wind pressure. As specifically shown in FIG. 11, the building 106 includes shear front wall 108 and side wall 110. A roof 112 covers the house, and is connected to the side wall 110 along the roof edge 114. The roof 112 rises from the eave 116 to a peak or ridge line 118 extending along the length of the house. The eave 116 of the roof 112 extends beyond the top 120 of the front wall 108, as shown in the cutaway portion of FIG. 11. This creates an overhang.

In order to strengthen the roof 112 of the building 106, FRP reinforcement strips of the invention are placed where they will have the greatest strength impact for withstanding high winds and earthquakes. An FRP reinforcement strip 122 is placed longitudinally along the ridge line 118. Since the upper portion of the roof is more vulnerable to high winds, another reinforcement strip 124 is added to the next lower horizontal joint between vertically adjacent wood sheathing panels. Another vulnerable area for wind uplift is near the eave 116. Therefore, a longitudinal FRP reinforcement strip 126 is added to the roof 112 at the eave 116, and another FRP reinforcement strip 128 is added to the next higher horizontal joint between vertically adjacent wood sheathing panels. Vertically extending FRP reinforcement strips 130 and 132 are placed at the roof edges 114, and additional strips 134 can be placed to cover the vertical joints between adjacent wood sheathing panels. Preferably, the entire perimeter of the roof 112 is reinforced with the FRP reinforcement strips of the invention. Therefore, it can be seen that the reinforcement strips are preferably concentrated at the ridge, eave and edge areas of the roof, for this is where the earliest and most prevalent high wind damage occurs, and this is where the reinforcement of the invention is most economical.

Although FIG. 11 shows the most crucial joints being reinforced with the FRP reinforcement strips 126, 128, 130, 132 and 134, it is to be understood that the strongest reinforcement configuration for the building 106 is for each of the joints between adjacent roof panels to be reinforced. Also, various special locations are preferably reinforced with special applications of the FRP reinforcement strips of the invention. For example, for additional wind uplift resistance, FRP reinforcement strips may be wrapped around the eaves and anchored onto a vertical wall surface as shown at 135. Also, the longitudinal reinforcement strips can extend around the edge 114 to be bonded to the side wall 110, as shown at 136.

It is to be understood that the reinforcing methods described in the specification and illustrated in FIGS. 1–11 may be used either separately or jointly depending on the application and desired result. After the building is completed, the additional exterior layer is added to the building. For example, shingles or tiles are applied to the roof after it has been reinforced according to the present invention. Also, siding or brickwork, as well as insulation sheathing, is added to the exterior of the shear walls.

The invention is not limited to any specific FRP type, resin type, synthetic fiber type, fiber architecture, laminate design, material delivery system, or any specific field application method. Any suitable thermosetting resin, such as phenolic, epoxy, vinylester, polyester, and the like, or thermoplastic resin combined with properly sized synthetic fibers, such as carbon, E-glass, S-glass, aramid, and the like, may be used. The FRP may be in the form of pre-cured sheets that are post-bonded to the sheathing, preimpregnated fabrics (prepregs), or on-site wet-impregnated fabrics or mats. The optimum FRP design depends on the application and may be determined using standard laminate analysis techniques, finite element analysis methods, and established composite materials design methods.

The orientation of the fibers within the FRP reinforcing strips of the invention is generally longitudinal with respect to the length of the reinforcement strips, as shown in FIG. 3. However, in many applications, the FRP reinforcement strips will have the fibers in other orientations, such as, for example, in a crossed pattern as shown in FIGS. 1 and 2. In FIG. 1, the fibers are oriented at an acute angle 15 with respect to the edge of the panel assembly 10. Likewise, the fibers in the strips 27–30 in FIG. 2 are at an acute angle 43 to the edge of panel assembly 20. Mats of woven fibers can also be used with the invention. While strips having oriented reinforcement fibers are generally preferred, mats of non-oriented fibers, such as wet process mats can be used.

An example of an FRP reinforcement strip of the invention is a fiberglass reinforced phenolic composite using a phenolic resin and a 26 ounce fabric, product code VEW 260, from Brunswick Technologies, Brunswick, Me. The resin to film ratio for this product is about 50/50. The fibers are all parallel, and are stitched together without a backing. The tensile strength of the reinforcement strip is 60 thousand pounds per square inch (kpsi) in the longitudinal direction, and the stiffness is 4–6 million psi. Another reinforcement product that can be used is Brunswick's U-18-01 unidirectional fabric, having longitudinal fibers stitched to a fabric backing. Yet another reinforcement product that can be used with the invention is Brunswick's Q-30 product, which is 30 oz. per square yard cross weave product having fibers oriented longitudinally and transverse, and also fibers oriented at plus or minus 45 degrees to the longitudinal.

The FRP reinforcement strips used with the invention can be purchased with or without the resin. Typical field installations of the FRP reinforcement of the invention involve wetting the reinforcement with the resin, applying the reinforcement to the desired location, and rolling the wetted reinforcement to assure good contact and to remove trapped air. Alternatively, the reinforcement can be purchased as a prepreg, applied to the desired location with or without additional resin, and heated to advance the resin and bond the reinforcement to the wood panels.

With proper design, the FRP reinforcing strips of the invention improve the continuity and load transfer between the individual sheathing panels. Most importantly, the reinforcing strips reduce the likelihood of individual roof or wall sheathing panels loss, the leading cause of wind and subsequent water related damage to wood construction during hurricanes. The strips also reduce stress concentrations at the edge of the panels, delay panel edge and corner curling or tear-out in shear walls, improve load distribution characteristics among sheathing nails, increase nail lateral resistance, and delay sheathing nail withdrawal or failure.

In addition to tying individual sheathing panels together, the FRP reinforcement strips of the invention can also be used to tie subassemblies together, such as shear wall-to-shear-wall, wall above-to-wall below, wall-to-roof, wall-to-floor, wall-to-foundation, wall-to-wall at corners, and roof-to-roof at ridges, as described above. Hence the strips may be used to provide better or stronger or alternative continuous load paths from roof to foundations. The strips significantly reduce the deformation of the structure by reducing the ability of movement (opening/closing) of the gaps between the individual sheathing panels.

The reinforcing strips shown in FIGS. (1–5) also improve the continuity and load transfer characteristics between shear walls located at different floors; they also improve the continuity and load transfer between shear walls and roof/floor diaphragms. When applied to the outside of the structure directly over the sheathing, the FRP reinforcement strips of the invention provide an easy-to-inspect wind/seismic resisting system for the building being constructed. Because the strips tie the sheathing panels together, improper nail spacing, improper nail edge distance, and improper nail penetration into the framing are less likely to result in damage to the structure when subjected to hurricane winds or earthquake loadings.

For additional strength, stiffness, and ductility the FRP reinforcement of the invention may also be introduced within the OSB or plywood panels during the manufacturing process. These reinforced panels can be delivered to the site with FRP reinforcement disposed within the thickness of the panels or over the surface of the panel. When used in lieu or in combination with the reinforcing strips applied in the field, the system provides exceptional added strength, stiffness, and ductility. When FRP reinforcement is disposed throughout the panel, it also provides more effective protection to wind-borne projectile impact. These projectiles can penetrate through normal sheathing, causing a danger to the building's occupants, causing an increase in internal pressures which can lead to loss of sheathing, and a higher risk of structural damage. Preferably, the reinforcement strips are applied to the interior or surface of the panels to cover an area that is within the range of from about 5 to about 50 percent of the surface area of the panels.

The principle and mode of operation of this invention have been described in its preferred embodiments. However, it should be noted that this invention may be practiced otherwise than as specifically illustrated and described without departing from its scope.

What is claimed is:

1. A building construction configuration having enhanced strength comprising:
    an assemblage of wood sheathing panels positioned adjacent one another to form a panel assembly having elongated joints between adjacent panels; and
    reinforcement strips of fiber reinforced polymer material bonded to the panels, the reinforcement strips covering an area that is within the range of from about 5 to about 50 percent of the surface area of the panels;
    wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

2. The building construction configuration of claim 1 in which the reinforcement strips overlap the joints and extend longitudinally along the joints.

3. The building construction configuration of claim 1 in which the reinforcement strips of fiber reinforced polymer material are bonded to the perimeter of the panel assembly.

4. A building construction configuration having enhanced strength comprising:
    an assemblage of wood sheathing panels positioned adjacent one another to form a panel assembly having elongated joints between adjacent panels; and
    reinforcement strips of fiber reinforced polymer material bonded to the panels, the reinforcement strips covering an area that is within the range of from about 5 to about 50 percent of the surface area of the panels, the reinforcement strips being bonded in diagonal strips that are at acute angles to the edges of the panel assembly;

wherein the strips of fiber reinforced polymer material have sufficient strength to strengthen the assemblage of wood sheathing panels and increase the resistance of the assemblage of wood sheathing panels to any one or more of the group consisting essentially of blasts, earthquakes, and wind loads.

5. The building construction configuration of claim 1 in which the panel assembly is one element of a group consisting essentially of shear walls, horizontal diaphragms and roof diaphragms.

6. The building construction configuration of claim 5 in which the reinforcement strips are placed intermittently transverse to the joints.

7. The building construction configuration of claim 1 wherein the strips of fiber reinforced polymer material have sufficient strength to strengthen the assemblage of wood sheathing panels and increase the resistance of the assemblage of wood sheathing panels to wind loads.

8. The building construction configuration of claim 1 wherein the strips of fiber reinforced polymer material have a tensile strength of about 60 thousand pounds per square inch in a longitudinal direction.

9. The building construction configuration of claim 1 wherein the strips of fiber reinforced polymer material have a stiffness within the range of about 4 million pounds per square inch to about 6 million pounds per square inch.

10. A building construction configuration having enhanced strength comprising:

an assemblage of wood sheathing panels positioned adjacent one another to form a panel assembly having elongated joints between adjacent panels; and reinforcement strips of fiber reinforced polymer material bonded to the panels, the reinforcement strips covering an area that is within the range of from about 5 to about 50 percent of the surface area of the panels, the reinforcement strips extending from some of the panels to a foundation of the building;

wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

11. A building construction configuration having enhanced strength comprising:

an assemblage of wood sheathing roof panels positioned adjacent one another to form a building roof having elongated joints between adjacent panels; and reinforcement strips of fiber reinforced polymer material bonded to the panels, the reinforcement strips covering at least 20 percent of the joints, thereby bonding together substantially all of the panels in the building roof, wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

12. The building construction configuration of claim 11 in which the reinforcement strips are concentrated at ridge, eave and edge areas of the roof.

13. A building construction configuration having enhanced strength comprising:

an assemblage of wood sheathing roof panels positioned adjacent one another to form a building roof having elongated joints between adjacent panels, wherein the building roof has ridge, eave and edge areas; and reinforcement strips of fiber reinforced polymer material bonded to the panels, where the reinforcement strips are concentrated at the ridge, eave and edge areas of the roof;

wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

14. A building construction configuration having enhanced strength comprising:

an assemblage of wood sheathing roof panels positioned adjacent one another to form a building roof;

an assemblage of wood sheathing shear wall panels positioned adjacent one another to form a building wall, where a joint is formed between the roof panels and the shear wall panels; and reinforcement strips of fiber reinforced polymer material bonded to at least some of the roof panels and at least some of the shear wall panels;

wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

15. The building construction configuration of claim 14 in which the reinforcement strips cover at least 20 percent of the length of the joint formed between the roof panels and the shear wall panels.

16. The building construction configuration of claim 14 in which the reinforcement strips wrap around edges and eaves of the roof and are bonded to a vertical shear wall.

17. A building construction configuration having enhanced strength comprising:

an assemblage of shear wood sheathing wall panels positioned adjacent one another to form a first building wall;

an assemblage of shear wood sheathing wall panels positioned adjacent one another to form a second building wall, where a joint is formed between the first building wall and the second building wall; and reinforcement strips of fiber reinforced polymer material bonded to at least some of the shear wall panels in the first building wall and at least some of the shear wall panels in the second building wall;

wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

18. The building construction configuration of claim 17 in which the reinforcement strips cover at least 20 percent of the length of the joint formed between the first building wall and the second building wall.

19. A method of constructing a building having enhanced strength comprising:

applying wood sheathing panels to a framework to form a building shell;

bonding reinforcement strips of fiber reinforced polymer material to the wood sheathing panels to bond at least some of the wood sheathing panels to each other; and covering the building shell with a finished exterior;

wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

20. The method of claim 19 including applying the reinforcement strips in an amount sufficient to cover an area that is within the range of from about 5 to about 50 percent of the surface area of the wood sheathing panels.

21. The method of claim 19 including applying the reinforcement strips so that they overlap the joints and extend longitudinally along the joints.

22. The method of claim 19 including applying the reinforcement strips to the perimeter at least some of the wood sheathing panels.

23. A method of constructing a building having enhanced strength comprising:

applying wood sheathing panels to a framework to form a building shell;

bonding reinforcement strips of fiber reinforced polymer material to the wood sheathing panels to bond at least some of the wood sheathing panels to each other; and covering the building shell with a finished exterior;

wherein the step of bonding the reinforcement strips includes applying the reinforcement strips in diagonal strips that are at acute angles to the edges of some of the wood sheathing panels; and wherein the strips of fiber reinforced polymer material have sufficient strength to strengthen the assemblage of wood sheathing panels and increase the resistance of the assemblage of wood sheathing panels to any one or more of the group consisting essentially of blasts, earthquakes, and wind loads.

24. The method of claim 19 in which the wood sheathing panels are used in at least one element of a group consisting essentially of shear walls, horizontal diaphragms and roof diaphragms.

25. A method of constructing a building having enhanced strength comprising:

applying wood sheathing panels to a framework to form a building shell in which the panels are used in a roof, wherein the roof has ridge, eave and edge portions;

bonding reinforcement strips of fiber reinforced polymer material to the wood sheathing panels of the roof to bond at least some of the wood sheathing panels to each other; and covering the building shell with a finished exterior, wherein the reinforcement strips are concentrated at the ridge, eave and edge areas of the roof;

wherein the strips of fiber reinforced polymer material have sufficient tensile strength to substantially strengthen the assemblage of wood sheathing panels, thereby substantially increasing the resistance of the assemblage of wood sheathing panels to any one or more of the group consisting essentially of blasts, earthquakes, and wind loads.

26. A building construction configuration having enhanced strength comprising:

an assemblage of wood sheathing panels positioned adjacent one another to form a panel assembly having elongated joints between adjacent panels; and reinforcement strips of fiber reinforced polymer material bonded to the panels, the reinforcement strips covering an area that is within the range of from about 5 to about 50 percent of the surface area of the panels;

wherein the reinforcement strips are placed intermittently along the joints; and wherein the strips of fiber reinforced polymer material have sufficient strength to substantially strengthen the assemblage of wood sheathing panels, thereby substantially increasing the resistance of the assemblage of wood sheathing panels to ally one or more of the group consisting essentially of blasts, earthquakes, and wind loads.

27. A building construction configuration having enhanced strength comprising:

an assemblage of wood sheathing panels positioned adjacent one another to form a panel assembly having elongated joints between adjacent panels; and reinforcement strips of fiber reinforced polymer material bonded to the panels, the reinforcement strips covering an area that is within the range of from about 5 to about 50 percent of the surface area of the panels;

wherein the reinforcement strips extend along the length of the joints an amount within the range of from about 60 to about 85 percent of the length of the joints; and wherein the strips of fiber reinforced polymer material have sufficient strength to substantially strengthen the assemblage of wood sheathing panels, thereby substantially increasing the resistance of the assemblage of wood sheathing panels to any one or more of the group consisting essentially of blasts, earthquakes, and wind loads.

28. A building construction configuration having enhanced strength comprising:

an assemblage of wood sheathing panels positioned adjacent one another to form a panel assembly having elongated joints between adjacent panels; and reinforcement strips of fiber reinforced polymer material bonded to the panels, the reinforcement strips covering an area that is within the range of from about 5 to about 50 percent of the surface area of the panels, and the reinforcement strips being placed intermittently transverse to the joints;

wherein the strips of fiber reinforced polymer material have sufficient strength to strengthen the assemblage of wood sheathing panels and increase the resistance of the assemblage of wood sheathing panels to any one or more of the group consisting essentially of blasts, earthquakes, and wind loads.

* * * * *